(12) United States Patent
Oakley et al.

(10) Patent No.: US 6,730,393 B1
(45) Date of Patent: May 4, 2004

(54) CUT-RESISTANT POLYMERIC SHEETS AND ARTICLES FORMED THEREFROM

(75) Inventors: Ehteridge Odell Oakley, Matthews, NC (US); Gregory J. Johnson, Charlotte, NC (US); Herman Leslie Lanieve, Warren, NJ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 08/947,169

(22) Filed: Oct. 8, 1997

(51) Int. Cl.[7] .................... B32B 5/02; B32B 27/32; B32B 27/36; B32B 27/34
(52) U.S. Cl. ................ 428/220; 2/2.5; 2/159; 152/197; 152/451; 428/328; 428/329; 428/332; 428/475.5; 428/480; 428/523; 428/911; 442/287; 442/290; 442/291; 442/294; 442/267; 442/394; 442/395; 442/398
(58) Field of Search .............. 2/161.7, 2.5, 455, 2/159, 161.6; 442/267, 287, 290, 291, 294, 394, 395, 398; 428/329, 911, 328, 423.1, 425.9, 447, 480, 475.5, 521, 522, 523, 220, 332; 152/197, 451

(56) References Cited

U.S. PATENT DOCUMENTS

| | | | |
|---|---|---|---|
| 3,185,751 A | | 5/1965 | Sutton |
| 3,622,650 A | * | 11/1971 | Berstein et al. ............. 524/493 |
| 3,630,237 A | * | 12/1971 | Varnell et al. ............. 138/176 |
| 4,433,024 A | * | 2/1984 | Eian ............. 428/198 |
| 4,967,819 A | * | 11/1990 | Kansupada ............. 152/524 |
| 5,051,301 A | | 9/1991 | Singh et al. ............. 428/288 |
| 5,087,499 A | | 2/1992 | Sullivan ............. 428/85 |
| 5,119,512 A | | 6/1992 | Dunbar et al. ............. 2/167 |
| 5,146,628 A | | 9/1992 | Herrmann et al. ............. 2/161 R |
| 5,183,702 A | * | 2/1993 | Taylor et al. ............. 428/266 |
| 5,200,263 A | | 4/1993 | Gould et al. ............. 428/323 |
| 5,224,363 A | | 7/1993 | Sutton ............. 66/202 |
| 5,352,724 A | * | 10/1994 | Fujiki et al. ............. 524/398 |
| 5,368,930 A | | 11/1994 | Samples ............. 428/323 |
| 5,580,652 A | * | 12/1996 | Lee et al. ............. 428/328 |
| 5,597,649 A | * | 1/1997 | Sandor et al. ............. 428/370 |
| 5,665,810 A | * | 9/1997 | Patchett et al. ............. 524/449 |
| 5,718,971 A | * | 2/1998 | Lee et al. ............. 428/329 |
| 5,817,433 A | * | 10/1998 | Darras ............. 428/408 |
| 5,851,668 A | * | 12/1998 | Sandor et al. ............. 428/397 |
| 5,939,183 A | * | 8/1999 | Kuratsuji et al. ............. 428/324 |
| 5,981,633 A | * | 11/1999 | Sandstrom et al. ............. 524/80 |
| 6,020,057 A | | 2/2000 | Darras |

FOREIGN PATENT DOCUMENTS

| | | | |
|---|---|---|---|
| EP | 0 370 802 | 5/1990 | |
| EP | 0 534 744 | 3/1993 | |
| EP | 0 599 231 | 5/1997 | |
| FR | 2564780 A | * 11/1985 | ............. B32B/7/12 |
| WO | WO 97 18345 | 5/1997 | |

OTHER PUBLICATIONS

Kirk–Othmer, Encyclopedia of Chemical Technology, Fourth Edition, vol. 1: Abrasives, p. 18, Apr. 1992.*

Patent Abstracts of Japan, Publication No. JP5331299; Publication Date: Dec. 14, 1993; vol. 18, No. 163, Ab. Date: Mar. 18, 1994; Patentee: Teijin Ltd.; Inventor: Minobe Nobuo, et al.

* cited by examiner

*Primary Examiner*—Ramsey Zacharia
(74) *Attorney, Agent, or Firm*—Alston & Bird LLP

(57) ABSTRACT

A polymeric sheet having excellent cut-resistance contains: (A) a polymeric material, and (B) a hard filler distributed in the polymeric material, the hard filler having a Mohs hardness value of at least about 3.0, the hard filler being in the form of particles having an average diameter sufficient to provide cut-resistance properties to the polymeric material but which is no more than about 5 microns. The cut-resistant sheet may be in the form of a conventional sheet, a film, a coating, a composite and the like, and may be used to form cut-resistance articles such as, e.g., protective garments and tires. The cut-resistant sheet may also be laminated onto a textile fabric to form a composite from which articles, e.g., garments, can be formed.

42 Claims, No Drawings

CUT-RESISTANT POLYMERIC SHEETS AND ARTICLES FORMED THEREFROM

BACKGROUND OF THE INVENTION

This invention relates to polymeric sheets and articles formed therefrom. More particularly, this invention relates to polymeric sheets and articles formed therefrom, especially elastomeric sheets and articles, wherein the sheets and articles have improved resistance to cutting by a sharp edge.

Polymeric sheets, particularly elastomeric sheets, having improved resistance to cutting with a sharp edge have long been sought. Cut-resistant sheets are useful for providing cut resistance to products ranging from medical equipment to surgical gloves.

Cut-resistant textile articles are disclosed, for example, in U.S. Pat. Nos. 5,200,263; 5,119,512; 5,146,628; and 5,224,363.

U.S. Pat. No. 5,200,263 teaches a puncture- and cut-resistant composite material and articles, e.g., gloves, made therefrom, wherein the composite material is composed of at least one elastomer layer containing a plurality of platelets oriented substantially parallel to the plane of the elastomeric layer, each of the platelets being a small, thin element substantially impervious to normally encountered puncturing and/or cutting by sharp instruments. This patent teaches the use of particles having a relatively large diameter, e.g. from about 1.5 mm to about 4.0 mm.

U.S. Pat. No. 5,119,512 discloses cut-resistant yarn and fabrics and gloves made therefrom. The reference further teaches a cut-resistant article composed of a cut-resistant jacket surrounding a less cut-resistant member. The cut-resistant jacket contains a fabric made from a yarn containing at least one high strength, longitudinal strand wrapped with a fiber. The less cut-resistant member is a rope, webbing, strap, hose or inflatable structure. The reference further teaches a highly cut-resistant composite yarn composed of at least two fibrous materials, wherein at least one fibrous material is cut-resistant and at least one fibrous material has a high level of hardness.

U.S. Pat. No. 5,224,363 discloses cut resistant protective garments, e.g., gloves, which are formed from high strength composite strands. The composite strands contain a cut-resistant core material coated with a fluid impervious material. The cut-resistant core material may be Kevlar®, aramid strands, stainless steel strands, or a combination of Kevlar® and stainless steel strands. The fluid impervious coating may be polyurethane or vinyl.

U.S. Pat. No. 5,146,628 discloses protective gloves coated with a polyurethane material. The polyurethane coating is abrasion-resistant, cut-resistant, flexible and soft and provides the glove with slip-resistance and gripping properties.

Puncture-resistant textile articles are also known in the art. Reference is made, e.g., to U.S. Pat. Nos. 5,363,930 and 5,087,499.

U.S. Pat. No. 5,363,930 teaches a thin elastomeric sheet material and protective clothing, e.g., gloves, made therefrom. The elastomeric sheet material has enhanced puncture-resistance and is prepared by embedding thin plate-like non-elastomeric particles in an elastomeric matrix. The preferred non-elastomeric particles have a hardness on the Mohs scale of at least 5 and include metals, ceramics and crystalline minerals. The particles used in this patent have a relatively large diameter, for example, about 3 mm.

U.S. Pat. No. 5,087,499 discloses puncture-resistant and medicinal treatment garments, e.g., gloves, formed from fibers such as Kevlar® or Spectra®. The fibers may be coated with an abrasive material such as, e.g., a mixture of ceramic or metallic particles and a polymeric resin.

U.S. Pat. No. 5,051,301 discloses composites and textile articles made therefrom, wherein the composites have improved toughness and contain a ceramic matrix and a plurality of layers of boron nitride-coated fibrous material. The ceramic matrix may be used in combination with an organic binding material.

Copending, commonly assigned U.S. patent application Ser. No. 08/752,297, filed Nov. 19, 1996, discloses the manufacture of cut-resistant garments such as gloves made from cut resistant fibers.

Although cut-resistant polymeric sheets are known in the art, it is continually desirable to provide polymeric sheets having improved cut-resistance.

Furthermore, it is desirable to impart improved cut-resistance to polymeric sheets by means of particles having relatively small diameters. Particles with relatively small diameters are easier to process than particles with relatively large diameters. Thus, small-diameter particles tend to produce smoother sheet surfaces than do large-diameter particles. However, particles which are too small, e.g., less than about 0.25 microns, tend to be less effective for providing cut-resistance. Larger-size particles provide better cut-resistance but also rougher sheet surfaces. Thus, it is desirable to use particles which provide both effective cut-resistance and relatively smooth sheet surfaces.

In addition, it would be desirable to provide cut-resistant polymeric sheets which form articles having improved flexibility and comfort as well as increased cut-resistance.

Accordingly, a primary object of this invention is to provide polymeric sheets, particularly elastomeric sheets, having improved cut-resistance.

A further object of this invention is to provide polymeric sheets having improved cut-resistance, wherein such sheets contain hard particles having relatively small diameters.

Another object of this invention is to provide cut-resistant polymeric sheets which form polymeric articles having improved cut-resistance, improved flexibility, and improved comfort.

These and other objects which are achieved according to the present invention can be discerned from the following description.

SUMMARY OF THE INVENTION

The present invention provides a polymeric sheet having excellent cut-resistance, containing:
(A) a polymeric material, and
(B) a hard filler distributed in the polymeric material, the hard filler having a Mohs Hardness value of at least about 3.0, the hard filler being in the form of particles having an average diameter which is sufficient to provide cut-resistant properties to said polymeric material but which is no larger than about 5 microns.

The present invention is further directed to cut-resistant articles formed from the cut-resistant polymeric sheet of this invention.

The present invention is also directed to composites containing the cut-resistant polymeric sheet of this invention laminated onto a cut-resistant or non-cut-resistant textile fabric. The present invention further includes articles composed of the aforementioned composite.

In preferred embodiments of the invention, the polymeric material is an elastomer, and the polymeric sheet is an elastomeric sheet.

An important advantage of the present invention is that improved cut-resistant properties are imparted to polymeric sheets by hard filler particles having relatively small diameters. Thus, articles formed from such polymeric sheets not only have excellent cut-resistance but also improved flexibility and comfort and relatively smooth surfaces.

DETAILED DESCRIPTION OF THE INVENTION

The present invention provides a cut-resistant polymeric sheet and cut-resistant articles formed from such polymeric sheet.

As used herein, the term "sheet" with respect to the polymeric sheet of this invention includes not only sheets in the conventional sense but also films, coatings, composites and the like.

As used herein with respect to the sheet and articles of this invention, the term "cut-resistant" means that such sheet and article are resistant to cutting by sharp-edged objects such as, e.g., knives and the like.

The cut-resistant sheet of this invention contains a polymeric material and a hard filler distributed in the polymeric material, wherein the hard filler has a Mohs Hardness value of at least about 3. The hard filler is in the form of particles having an average diameter which is sufficient to provide cut-resistance properties to the polymeric material but which is no larger than about 5 microns.

The polymeric material used in the cut-resistant sheet of this invention is preferably an elastomer or a thermoplastic material.

Non-limiting examples of suitable elastomeric polymers which can be used in the cut-resistant sheet of this invention include natural rubber, synthetic rubber and thermoplastic elastomers. Specific examples of suitable elastomeric polymers include, e.g., polyvinyl chloride, polyurethane, nitrile rubber, vinyl rubber, polyisoprene, neoprene, and chloroprene. Preferred elastomeric polymers for use in this invention include polyurethane, polyvinyl chloride and silicone rubber.

Thermoplastic polymers which can serve as the polymeric material in the present invention include amorphous polymers, semi-crystalline polymers, and liquid crystalline polymers. Of these, semi-crystalline and liquid crystalline polymers are preferred.

A particularly preferred thermoplastic polymer is an isotropic semi-crystalline polymer. "Isotropic" refers to polymers which are not liquid crystalline polymers, which are anisotropic. Preferably, the isotropic semi-crystalline polymer is melt-processable. Non-limiting examples of highly useful semi-crystalline polymers include poly(alkylene terephthalates), poly(alkylene naphthalates), poly(arylene sulfides), aliphatic and aliphatic-aromatic polyamides, and polyesters comprising monomer units derived from cyclohexanedimethanol and terephthalic acid. Examples of specific semi-crystalline polymers include poly(ethylene terephthalate), poly(butylene terephthalate), poly(ethylene naphthalate), poly(phenylene sulfide), poly(1,4-cyclohexanedimethanol terephthalate) (wherein the 1,4-cyclohexanedimethanol is a mixture of cis and trans isomers), nylon 6, nylon 6,6 and nylon 6,10. Polyolefins, particularly polyethylene and polypropylene, are other semi-crystalline polymers that may be used as the polymeric material in the present invention. Extended chain polyethylene, which has a high tensile modulus, is made by the gel spinning or the melt spinning of very high or ultrahigh molecular weight polyethylene.

The preferred semi-crystalline isotropic polymer for use as the polymeric material in this invention is poly(ethylene terephthalate).

The polymeric material may also be a liquid crystalline polymer (LCP), preferably a thermotropic LCP. LCPs give fibers with very high tensile strength and/or modulus. Non-limiting examples of suitable thermotropic LCPs include aromatic polyesters, aliphatic-aromatic polyesters, aromatic poly(esteramides), aliphatic-aromatic poly(esteramides), aromatic poly(esterimides), aromatic poly(estercarbonates), aromatic polyamides, aliphatic-aromatic polyamides and poly(azomethines). The preferred thermotropic LCPs are aromatic polyesters and poly(esteramides) which form liquid crystalline melt phases at temperatures less than about 360° C. and include one or more monomer units derived from terephthalic acid, isophthalic acid, 1,4-hydroquinone, resorcinol, 4,4'-dihydroxybiphenyl, 4,4'-biphenyldicarboxylic acid, 4-hydroxybenzoic acid, 6-hydroxy-2-naphthoic acid, 2,6-naphthalenedicarboxylic acid, 2,6-dihydroxynaphthalene, 4-aminophenol, and 4-aminobenzoic acid. Some of the aromatic groups may include substituents which do not react under the conditions of polymerization, such as, e.g., lower alkyl groups having 1–4 carbons, aromatic groups, fluorine, chlorine, bromine and iodine.

The most preferred thermoplastic polymers which can serve as the polymeric material in the present invention include polyethylene terephthalate, polypropylene, polyethylene, nylon 6, nylon 6,6, nylon 6,10, and polyethylene naphthalate.

The hard filler distributed in the elastomer polymer of the sheet of this invention has a Mohs Hardness value of at least about 3, more preferably at least about 4 and most preferably at least about 5.

The hard filler used in this invention is in the form of particles. The hard filler particles may be in the form of flat particles (i.e., platelets), elongated particles (i.e., needles), irregularly-shaped particles, or round particles. Preferably, the hard filler particles are in the form of platelets because platelets are more efficient in imparting cut resistance.

The average particle diameter of the hard filler particles is sufficient to provide cut-resistant properties to the polymeric material but which is no larger than about 5.0 microns. Preferably, the average particle diameter of the hard filler particles ranges from about 0.25 to about 5.0 microns, more preferably from about 1.0 to about 5.0 microns. For flat or elongated particles, the particle diameter refers to the length along the long axis of the particle (i.e. the long dimension of an elongated particle or the average diameter of the face of a platelet).

The hard filler distributed in the polymeric material is preferably a metal or metal alloy, a ceramic material or a crystalline mineral. Suitable metals include, e.g., tungsten, copper, brass, bronze, aluminum, steel, iron, monel, cobalt, titanium, magnesium, silver, molybdenum, tin and zinc. Non-limiting examples of suitable crystalline minerals include baddeleyite, chloritoid, clinozoisite, chondrodite, euclasite, petalite, sapphire, spodumene, staurolite, and clay. Suitable ceramic materials include, e.g., glass and alumina. Most preferably, the hard filler used in the sheet of this invention is alumina.

The hard filler may be added to the polymeric material by any of the standard methods of adding a filler to a resin. For example, the combining of the hard filler and the polymeric material can be carried out in an extruder, e.g., a twin screw extruder, by mixing the hard filler with molten polymer under conditions sufficient to provide a uniform distribution of the filler in the polymer. The hard filler may also be present during the manufacture of the polymeric material.

The sheet of this invention preferably contains from about 1% to about 15% by weight of the hard filler.

The sheet may also contain conventional additives such as, e.g., thickening agents.

If the sheet of this invention is in the form of a film or coating, the sheet preferably has a thickness of less than about 5 millimeters, more preferably from about 2 to about 3 millimeters.

As a film or coating, the sheet of this invention may be used as a cut-resistant film or coating on such articles as garments, e.g., gloves, aprons, and the like, and tires. With respect to tires, the particles can be compounded in the elastomeric part of the tire or contained in the fiber part of the tire.

A cut-resistant film within the scope of this invention may be formed by any conventional method for making films such as, e.g., extrusion, extrusion coating and the like.

A cut-resistant coating within the scope of this invention may be applied to an initial article by conventional methods such as, e.g., extrusion, extrusion coating, dipping, spraying, flowing, rolling, brushing, partial coating, dotting, and strudeling in lines or zig-zag patterns, with dipping being more preferred. When the coating is applied to the article by dipping, the coating composition may be in the form of latex, solution, melt or any other liquid form capable of conversion in situ to a fully dried or cured coating. The article is dipped into the liquid coating composition and thereafter removed, carrying with it a coating of the elastomer and hard filler distributed in the elastomer. It may be desirable to allow the elastomer to dry or otherwise cure and thereafter repeat the dipping process a number of times to assure substantially complete coverage of the outer surface of the article with the coating.

In one preferred embodiment, the cut-resistant coating will completely cover or substantially cover the outer surface of the initial article. In other embodiments, the coating may be disposed non-uniformly on the outer surface of the initial article.

The conventional sheet of this invention may be formed by any conventional method used to form sheets, such as, e.g., molding or extrusion. The conventional sheet of this invention generally has a thickness which is greater than that of the film or coating of this invention. Preferably, the conventional sheet of this invention has a thickness ranging from about 0.0005 inch to about 0.5 inch.

The present invention is further directed to an article formed from the cut-resistant sheet of this invention. In addition, the present invention is directed to composites composed of the cut-resistant sheet of this invention laminated onto a cut-resistant or non-cut-resistant textile fabric. Furthermore, the present invention is directed to articles containing the aforementioned composite.

For example, the sheet of this invention may be used to form cut-resistant garments or may be laminated with cut-resistant or non-cut-resistant textile fabric to form cut-resistant garments. In addition, a cut-resistant safety glove designed for use in the food processing industries may be manufactured from the sheet of this invention or from a laminate composed of the sheet and a fabric of particle-filled or non-particle-filled fibers. Such a glove is highly flexible and readily cleanable. The filled fiber resists flexural fatigue. Protective medical gloves may also be made using the cut-resistant sheet of this invention, by itself or as a laminate with the aforementioned fabric.

The sheet of this invention may also be used by itself or as a laminate with the aforementioned fabric to form cut-resistant side curtains and tarpaulins for trucks, soft-sided luggage, commercial upholstery, inflatables, fuel cells, collapsible packaging, airline cargo curtains, firehose sheaths, cut-resistant aprons for use in metal packing, chaps, and the like.

The fabric which can be used in combination with the sheet of this invention to form a laminate can be knitted, woven or non-woven.

An article within the scope of this invention may also be formed by dipping a mandrel into a latex solution containing the polymeric material and the hard filler distributed in the polymeric material. For example, a glove may be formed by dipping a hand-shaped mandrel into a particle-filled elastomer latex solution to form an elastomeric glove of improved cut resistance.

As stated previously herein, articles formed from the sheet of this invention have improved cut-resistance, flexibility, and comfort and relatively smooth surfaces.

What is claimed is:

1. A cut resistant polymeric sheet comprising:
   (A) a polymeric thermoplastic material selected from the group consisting of polyethylene terephthalate, polypropylene, polyethylene, nylon 6, nylon 6,6 nylon 6,10, and polyethylene naphthalate, and
   (B) a hard filler distributed in the polymeric thermoplastic material, the hard filler having a Mohs Hardness value of at least 3.0, the hard filler being in the form of particles having as average diameter from about 0.25 microns to about 5 microns, said sheet ranging in sickness from about 2 millimeters to about 5 millimeters, wherein said filler comprises from about 1% to about 15% by weight of said sheet.

2. A sheet according to claim 1, wherein the hard filler has a Mohs, Hardness value of at least 4.

3. A sheet according to claim 1, wherein the hard filler particles have an average diameter of from about 1 to about 5 microns.

4. A sheet according to claim 1, wherein the hard file particles are selected from the group consisting of platelets, needles, irregularly-shaped particles, and round particles.

5. A sheet according to claim 1, wherein the hard filler is selected from the group consisting of metals, metal alloys, ceramic materials and crystalline minerals.

6. A sheet according to claim 1, wherein the hard filler is alumina.

7. A sheet according to claim 1, wherein said sheet has a thickness of from about 2 to about 3 millimeters.

8. A sheet according to claim 1, wherein the hard filler is uniformly distributed in the polymeric material.

9. A cut resistant article comprising a polymeric sheet, said sheet comprising:
   (A) a polymeric thermoplastic material selected from the group consisting of polyethylene terephthalate, polypropylene, polyethylene, nylon 6, nylon 6,6, nylon 6,10, and polyethylene naplithalate, and
   (B) a hard filler distributed in the polymeric thermoplastic material, the hard filler having a Mohs Hardness value of at least 3.0, the hard filler being in the form of particles having an average diameter from about 0.25 microns to about 5 microns, wherein said filler comprises from about 1% to about 15% by weight of said sheet.

10. A article according to claim 9, where in the hard filler particles have an average diameter of from about 1 to about 5 microns.

11. An article according to claim 9, wherein the hard filler is selected from the group consisting of metals, metal alloys, ceramic materials and crystalline minerals.

12. An article according to claim 11, wherein the hard filler is alumina.

13. An article according to claim 9, wherein the sheet is a film or coating.

14. An article according to claim 9, wherein the article is a protective garment.

15. An article according to claim 14, wherein the article is a glove.

16. An article according to claim 9, wherein the filler comprises greater than 4% by weight of said sheet.

17. An article according to claim 9, wherein the hard filler is uniformly distributed in the polymeric material.

18. An article according to claim 9, wherein the article is formed by dipping a mandrel in a latex solution comprising said polymeric material and said hard filler distributed in said polymeric material.

19. A cut resistant article formed from a polymeric sheet, said sheet comprising:
(A) a polymeric material, and
(B) a hard filler distributed in the polymeric material, the hard filler having a Mohs Hardness value of at least about 3.0, the had filler being in the from of particles having an average diameter from about 0.25 microns to about 5 microns, wherein said filler comprises from about 1% to about 15% by weight of said sheet, wherein the article is a tire and the polymeric material is an elastomer or fiber.

20. A composite comprising a cut-resistant polymeric sheet and a textile fabric laminated onto one another, the cut-resistant polymeric sheet comprising:
(A) a polymeric thermoplastic material selected from the group consisting of polyethylene terephthalate, polypropylene, polyethylene, nylon 6, nylon 6,6, nylon 6,10, and polyethlene naphthalate, and
(B) a hard filler distributed in the polymeric thermoplastic material, he hard filler having a Mohs Hardness value of at least 3.0, the hard filler being in the form of particles having an average diameter from about 0.25 microns to about 5 microns wherein said filler comprises from about 1% to about 15% by weight of said sheet.

21. A composite according to claim 20, wherein said textile fabric is formed from particle-filled fibers.

22. A composite according to claim 20, wherein said textile fabric is formed from non-particle-filled fibers.

23. A composite according to claim 20, wherein said textile fabric is non-woven.

24. A composite according to claim 20, wherein said textile fabric is woven.

25. An article comprising the composite of claim 20.

26. A composite according to claim 20, wherein the bard filler is uniformly distributed in the polymeric material.

27. A self-supporting cut resistant polymeric sheet comprising:
(A) a polymeric thermoplastic material selected from the group consisting of polyethylene terephthalate, polypropylene, polyethylene, nylon 6, nylon 6,6, nylon 6,10, and polyethylene naphthalate, and
(B) a hard filler distributed in the polymeric thermoplastic material, the hard filler having a Mohs Hardness value of at least 3.0, the hard filler consisting essentially of particles having an average diameter from about 0.25 microns to about 5 microns, wherein said filler comprises from about 1% to about 15% by weight of said sheet.

28. A sheet according to claim 27, wherein the hard filler has a Mohs Hardness value of at least 4.

29. A sheet according to claim 27, wherein the hard filler particles have an average diameter of from about 1 to 5 microns.

30. A sheet according to claim 27, wherein the hard filler particles are selected from the group consisting of platelets, needles, irregularly-shaped particles, and round particles.

31. A sheet according to claim 27, wherein the hard filler is selected from the group consisting of metals, metal alloys, ceramic material; and crystalline minerals.

32. A sheet according to claim 27, wherein the hard filler is alumina.

33. A sheet according to claim 27, wherein the sheet is a film.

34. A sheet according to claim 27, wherein the sheet has a thickness of from about 0.0005 inch to about 0.5 inch.

35. A sheet according to claim 27, wherein the filler comprises greater than 4% by weight of said sheet.

36. A sheet according to claim 27, wherein the hard filler is uniformly distributed in the polymeric material.

37. A cut resistant article comprising a substrate and a cut-resistant polymeric sheet, said sheet comprising:
(A) a polymeric thermoplastic material selected from the group consisting of polyethylene terephthalate, polypropylene, polyethylene, nylon 6, nylon 6,6, nylon 6,10, and polyethylene nanhthalate having a thickness of about 2 millimeters to about 5 millimeters disposed as a coating on a surface of said substrate, and
(B) a hard filler distributed in the polymeric thermoplastic material, tile hard filler having a Mohs Hardness value of at least 3.0, the hard filler being in the form of particles having an average diameter from about 0.25 microns to about 5 microns, wherein said filler comprises from about 1% to about 15% by weight of said sheet.

38. An article of claim 37, wherein said particle is a glove.

39. An article according to claim 37, wherein the hard filler is uniformly distributed in the polymeric material.

40. A cut resistant article comprising a substrate and a cut-resistant polymeric sheet, said sheet comprising:
(A) a polymeric thermoplastic material selected from the soup consisting of polyethylene terephthalate, polypropylene, polyethylene, nylon 6, nylon 6,6, nylon 6,10, and polyethylene naphthalate, and
(B) a hard filler distributed in the polymeric thermoplastic material the hard filler having a Mohs Hardness value of at least 3.0, the hard filler consisting essentially of particles having an average diameter from about 0.25 microns to about 5 microns, wherein said filler comprises from about 1% to about 15% by weight of said sheet.

41. An article according to claim 40, wherein the filler comprises greater than 4% by weight of said sheet.

42. An article according to claim 40, wherein the hard filler is uniformly distributed in the polymeric material.

* * * * *

UNITED STATES PATENT AND TRADEMARK OFFICE
CERTIFICATE OF CORRECTION

PATENT NO.    : 6,730,393 B1
DATED         : May 4, 2004
INVENTOR(S)   : Oakley et al.

It is certified that error appears in the above-identified patent and that said Letters Patent is hereby corrected as shown below:

Column 6,
Line 38, "sickness" should read -- thickness --;
Line 42, remove the comma (,) after "Mohs";
Line 63, "naplithalate" should read -- naphthalate --.

Column 7,
Line 4, "where in" should read -- wherein --;
Line 60, "bard" should read -- hard --.

Column 8,
Line 19, remove the semicolon (;) after "material";
Line 40, "tile" should read -- the --;
Line 46, "particle" should read -- article --.

Signed and Sealed this

Tenth Day of August, 2004

JON W. DUDAS
*Acting Director of the United States Patent and Trademark Office*